United States Patent Office 3,851,045
Patented Nov. 26, 1974

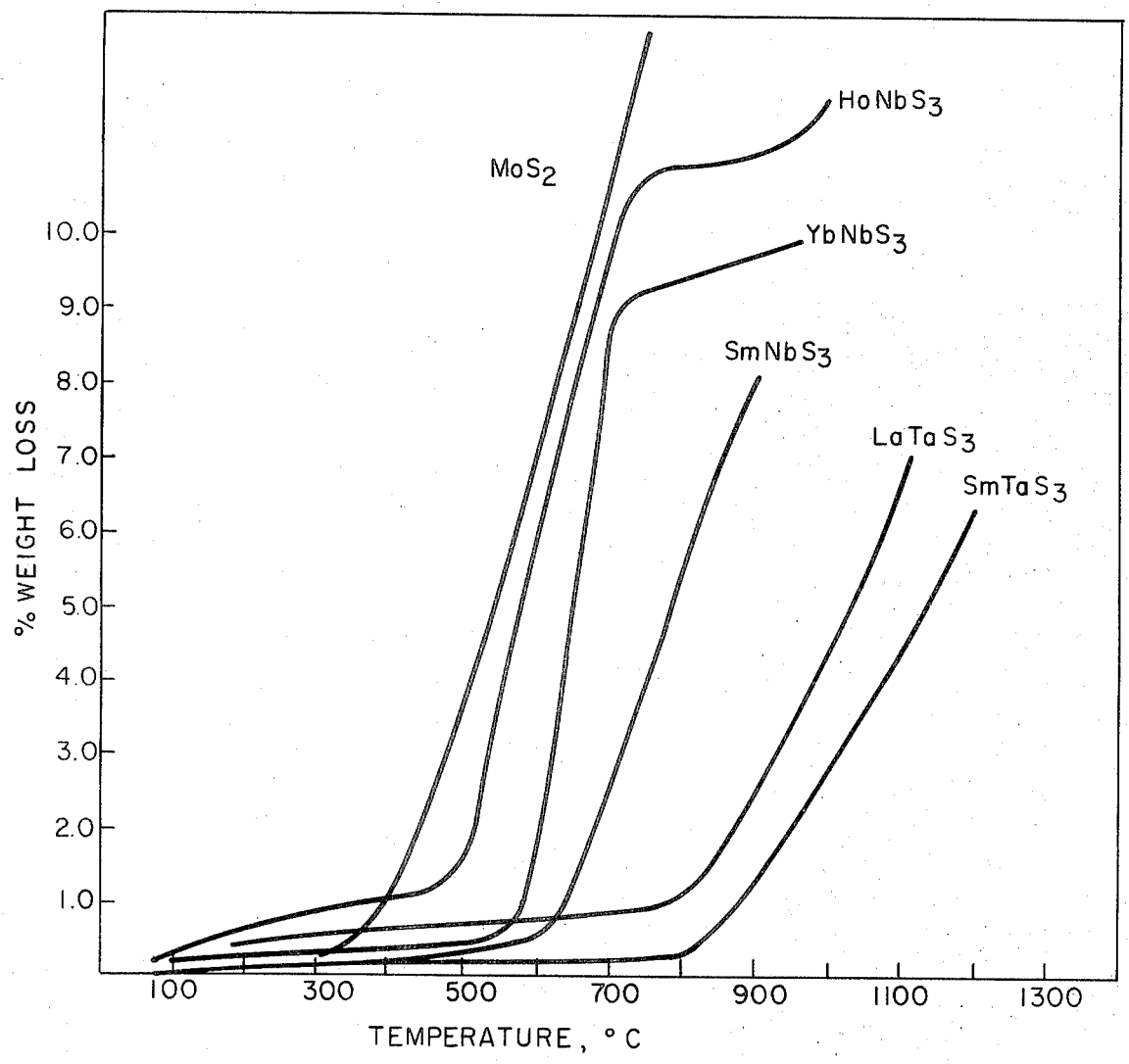

3,851,045
LANTHANIDE TRANSITION METAL
TERNARY CHALCOGENIDES
Paul Christopher Donohue, Wilmington, Del., assignor to E. I. du Pont de Nemours and Company, Wilmington, Del.
Filed Nov. 9, 1973, Ser. No. 414,289
Int. Cl. C01b 19/00, 17/00; C01f 17/00; C01g 29/00
U.S. Cl. 423—263                                   7 Claims

ABSTRACT OF THE DISCLOSURE

Tertiary chalcogenides of the formula $$Ln^{+3}M^{+4}X_3^{-2}$$

wherein
$Ln^{+3}$ is bismuth, yttrium or a lanthanide element,
$M^{+4}$ is titanium, vanadium, niobium or tantalum,
$X^{-2}$ is sulfur or selenium, and
the ionic radius ratio

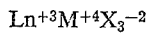

is at least about 0.82 are useful as high temperature lubricants.

BACKGROUND OF THE INVENTION

(1) Field of the invention

This invention relates to ternary chalcogenides and more particularly to lanthanide transition metal ternary sulfides and selenides.

(2) Description of the prior art

Relatively little is known of the sulfides of the lanthanide rare earth metals. Ternary sulfides containing a lanthanide element and a transition metal have been reported by Takahashi et al. in Materials Research Bulletin, Vol. 6, pp. 173–182 (1971). Such compounds as $LaMS_3$ are known only when the lanthanide element is lanthanum itself and the transition metal is one of the trivalent ions, Cr, Mn, Fe or Co. The crystal structure is characterized by a complex monoclinic or hexagonal X-ray pattern. The properties typified by $LaCrS_3$ include non-magnetic and electrically insulating behavior.

L. Schmidt, Physics Letters 31A, pp. 551–2 (1970), reports the preparation and electrical properties of $PbMS_3$, M=Ti, Nb, Ta. All are reported to have tetragonal cells; c.$PbTiS_3$, a.=4.11 A., c.=11.75 A.; $PbNbS_3$, a.=4.07 A., c.=11.92 A.; $PbTaE_3$, a.=4.08 A., c.=11.97 A.

$PbTiS_3$ is also reported by V. W. Sterzel and J. Horn, Zeit. f. anorg. u. allg. Chem. Band 376, 254 (1970).

SUMMARY OF THE INVENTION

There has now been discovered ternary chalcogenides of the formula $$Ln^{+3}M^{+4}X_3$$

wherein
$Ln^{+3}$ is a trivalent cation selected from the group consisting of bismuth, yttrium and the lanthanide elements of atomic number 57 through 71 inclusive,
$M^{+4}$ is a tetravalent transition metal cation selected from the group consisting of titanium, vanadium, niobium and tantalum,
$X^{-2}$ is a divalent chalcogenide anion selected from the group consisting of sulfur and selenium, and
the ionic radius ratio $$\frac{r_{Ln}^{+3}+r_M^{+4}}{r_X^{-2}}$$

is at least 0.82.

These ternary chalcogenides are characterized by metallic conductivity and isotypic pseudotetragonal structure which is manifested in black, flaky crystals having good lubricating qualities as well as good thermal stability.

BRIEF DESCRIPTION OF THE DRAWING

The drawing illustrates the high temperature stability of the compositions of this invention in air as compared with the prior art compound, $MoS_2$.

DETAILED DESCRIPTION OF THE INVENTION

The stoichiometry of the compositions of the present invention may be viewed as consisting of a trivalent cation, a tetravalent cation ion, a "free electron" and three divalent chalcogenide ions. Various combinations of ions may be employed as long as the radius ratio $$R=\frac{r_{Ln}^{+3}+r_M^{+4}}{r_X^{-2}} \geq 0.82$$

In the use of ionic radii to delineate the combination of elements appropriate to the invention, a consistent table of ionic radii must be used. A table suitable for this purpose is that of Shannon and Prewitt, Acta Crystallographica, Vol. B25, pages 925–926 (1969) as revised in Vol. B26, page 1046 (1970). For consistency the ionic radii used are those appropriate to six-fold coordination for each of the $Ln^{+3}$, $M^{+4}$ or $X^{-2}$ ions. The appropriate $Ln^{+3}$ ions shown there include in addition to the lanthanide rare earths, also bismuth and yttrium which are commonly associated with the trivalent lanthanide rare earths and are herein specifically included in the designation "Ln." For convenience the Shannon and Prewitt radii for six-fold coordination are given in Table 1 for the ions appropriate to this invention.

TABLE 1.—IONIC RADII, A

| Trivalent cations | | | |
|---|---|---|---|
| La, 1.045 | Nd, .983 | Gd, .983 | Y, .900 |
| Bi, 1.02 | Pm, .97 | Tb, .923 | Er, .890 |
| Cl, 1.01 | Sm, .958 | Dy, .912 | Tm, .888 |
| Pr, .997 | Eu, .947 | Ho, .901 | Yb, .868 |
| | | | Lu, .861 |

| Tetravalent cations | | | |
|---|---|---|---|
| V, .59 | Ti, .605 | Ta, .66 | Nb, .69 |

| Divalent anions | |
|---|---|
| S, 1.84 | Se, 1.98 |

When the radius ratio, R, is less than 0.82 the stoichiometry, $LnMX_3$, is not readily obtained using synthetic procedures that work well with compositions having larger average cation size such that R is at least 0.82. The critical radius ratio is more broadly obtained with the smaller sulfide than with the larger selenide ion. Thus, for the sulfides the size conditions are met for all cation combinations except those combining the smallest lanthanides (Dy to Lu) with the smaller transition metals, V and Ti. For the selenides the cation combinations are more restrictive; while each of the listed $Ln^{+3}$ and $M^{+4}$ cations are operative they should be combined so that their sum is at least 1.62 in order to meet the desired value of $R \geq 0.82$.

It will be apparent that this extensive series of compounds meets most of the general criteria for solid solutions, i.e. isotypic crystal structures embracing ions of similar size and electronic structure. It is to be expected therefore that partial substitution among the $Ln^{+3}$ ions will be possible within the bounds of the radium ratio requirements given above, and even that some $Ln^{+3}$ ions, themselves too small for combination with certain $M^{+4}$ cations, may be substituted in small amounts for larger $Ln^{+3}$ ions so that the average cation radius yields at least

is at least 0.82.

the minimum value of R. The greater disparity in both size and electronic configuration among the transition metals M and the chalcogenides X offers more restrictive possibilities of partial substitution of these ions.

From the discussion above it can be seen that the larger $Ln^{+3}$ ions are more readily accommodated in the structure. Thus, those compositions, $LnMX_3$, wherein the radius ratio, R, is at least 0.85 constitute a preferred class of the invention. Furthermore economic advantages accrue to the five largest $Ln^{+3}$ ions because of the availability of bismuth and of the largest rare earths, La, Ce, Pr and Nd, in the form of mischmetal alloy—a mixture of these generally containing a major amount of cerium. Similar advantages pertain to the sulfides compared to the selenides.

Limitation of the transition metals to Ti, V, Nb and Ta probably results from electronic factors as well as size factors. Normally trivalent M ions such as Cr and Fe in $LnMX_3$ apparently do not give rise to the delocalized electrons responsible for metallic conduction in the compounds of this invention. Transition metals such as Zr and Hf have tetravalent ions of appropriate size but these are too stable to provide the delocalized electron (which might be formally viewed, e.g., as $Zr^{+3} \equiv Zr^{+4} + e^-$). For a similar reason and because of the well known stability of divalent europium, the combination $EuTiS_3$ is specifically excluded from this invention. The Eu-Ti compound, formulated as $Eu^{+2}Ti^{+4}S_3$, lacks both the trivalent rare earth and the delocalized electron characteristic of the compounds disclosed here. The analogous selenide $EuTiSe_3$ and possible $Yb^{+2}$—$Ti^{+4}$ combinations are probably precluded by both electronic and size factors.

In the $LnMX_3$ compounds of this invention the formulation of the transition metals as $M^{+4}$ ions is made as an aid to understanding the scope and properties of the compositions. It is not to be inferred that the precise electronic state of these multivalent elements has been established.

Those species of the compounds, $LnMX_3$, comprising the elements cited above and with radius ratios of at least about 0.82 can be prepared by direct combination of the elements at temperatures above about 800° C. at atmospheric pressure. It is preferred to carry out the reaction in sealed tubes, free of air, and especially in the presence of very small quantities of iodine which facilitates reaction and promotes crystal growth, presumably through a vapor transport mechanism. The time of reaction varies with the temperature, particle size and degree of mixing. It is preferred to maintain a temperature of about 1000–1200° C. for at least about 16 hours, but it is best to reach this temperature progressively to avoid bursting the vessel from high pressure of sulfur or selenium before it has been combined with the metals. Silica or quartz tubes make convenient vessels, but when heating with the more reactive rare earth metals it is desirable to first coat the interior with pyrolyzed carbon to insure against reactivity with silica.

The elements should be reacted in approximately stoichiometric proportions. Substantial excess of the metals is difficult to remove, while excess sulfur or selenium may cause undue pressure build-up. Homogeneous products can be assured by intermediate grinding during the course of the reaction once the chalcogenide has been fully taken up by the metals.

It will be obvious that other synthetic processes will be applicable, such as the use of precursors of the component elements. Thus the passage of $CS_2$ vapor over the oxides of the metals may be used as described in the Takahashi reference cited above.

The compounds of the invention have electrical resistivities of the order of $10^{-4}$ ohm cm. and thus are useful as metallic conductor elements. The compounds are also particularly useful as high temperature lubricants. Like the well known lubricants, $MoS_2$ and graphite, these compounds have a layered crystal structure which is conducive to good lubricity. Thus, utility is evident from the slippery feel of the crystals, from measured coefficients of friction, and from the surprisingly low change in weight when heated in air.

Coefficients of friction were measured on a rotary thrust testing apparatus wherein bearing pads are pressed under measured load against a rotating surface, and the lateral force measured by strain gauge. In these tests a speed of 100 r.p.m. was used. The rotating surface and the bearing pads were of polished tool steel (type 52100 hardened to $R_c$ 63). Three ¼-inch diameter bearing pads held under a load of 2340 grams formed an annular wear track about ¼" wide with a mid radius of 0.4".

In one series of tests the steel pads were run dry, the friction noted, and then powdered lubricant was added to the wear track and the coefficient of friction again noted. For comparative purposes lubricant grade $MoS_2$ and graphite were also tested under identical conditions. The $LnMX_3$ compositions used were ground to pass through 325 mesh, but were not otherwise optimized for particle size and distribution as the commercial lubricants were. The measured coefficients of friction are shown in Table 2.

TABLE 2

COEFFICIENT OF FRICTION FOR LUBRICANT POWDERS

Prior art:
  Control (none) _____ 0.65
  Talc _____ 0.75
  Lead _____ 0.67
  $MoS_2$ _____ 0.18
  Graphite _____ 0.09
Invention:
  $SmNbS_3$ _____ 0.21
  $HoNbS_3$ _____ 0.22
  $GdTaS_3$ _____ 0.22

In another series of tests ¼" diameter discs of $HoNbS_3$ were pressed at room temperature and sintered in argon at 1000° C. They were then glued to the surface of the bearing pads and the friction measured against the rotating tool steel surface. The measured coefficient of friction was 0.24 compared to a value of 0.13 for the lubricant grade $MoS_2$ pressed at room temperature and sintered at 900° C.

While the $LnMX_3$ compositons of this invention are useful dry lubricants at room temperature, their advantage at high temperature is particularly great. When heated in air they are considerably more stable than $MoS_2$ presently used at high temperature. This is shown by the results of thermogravimetric analysis shown in the drawing. The much better conductivity of the $LnMX_3$ compounds compared to the insulating $MoS_2$ offers a further advantage in high temperature heat dissipation. It is contemplated that the good high temperature lubricity of these novel compositions renders them useful as dry lubricants, as dispersions in lubricating oils, and as shaped bearing surfaces.

EXAMPLES OF THE INVENTION

The following examples, illustrating the preparation and properties of the novel compounds of this invention, are given without any intention that the invention be limited thereto. All parts and percentages are by weight unless otherwise specified.

EXAMPLE 1

A mixture corresponding to $SmNbS_3$ (0.6644 g. Sm, 0.4106 g. Nb, 0.4251 g. S) was sealed with 0.05 g. of $I_2$ in a carbon-coated silica tube, which was heated in a natural gradient tube furnace. The end containing the reactants was heated at 600° C.; the end extending to the furnace opening was at about 200° C. After 2 days the temperature was raised to 800° C. in the center and about 400° C. at the cooler end. After 2 days the tube was removed, shaken to better mix the reagents, and reheated at 860° C. in the hot region. After 2 days more all the sulfur appeared to be taken up. The tube was opened, the product reground, resealed in silica and reheated at 850° C. over the entire tube for 2 days. The product was primarily a black, sintered compact with a small amount of white material which looked like $SmI_3$. The product was reground, pelleted and reheated in a sealed silica tube at 1000° C. for 12 hours. The product was composed of some hard black regions and some large black plate-like crystals. Both regions showed the same powder patterns indicating a single phase. The pattern was tentatively indexed on the basis of a tetragonal cell, a.=4.02 A., c.=11.92 A. Chemical analysis of separated crystals: Found 27.97% S, 25.65% Nb; Calc. for $SmNbS_3$ 28.34% S, 27.36% Nb.

EXAMPLE 2

A mixture corresponding to $SmTaS_3$ (0.5276 g. Sm, 0.6349 g. Ta, 0.3375 g. S) was sealed with 0.05 g. of $I_2$ in an evacuated carbon-coated silica tube. It was treated as described in Example 2 except that rather than opening and regrinding, the entire tube was merely reheated at 1150° C. for 2 days. The tube contained four regions: a black microcrystalline mass, large black plates growing out of the mass, and black crystals transported to both ends. All regions showed the same X-ray pattern indicating a single product of stoichiometry of the starting ratio. More detailed X-ray analysis of a crystal indicates a monoclinic structure a.=6.065, b.=5.650, c.=11.278, $\beta=94.85°$. Chemical analysis on some large flakes which were picked out gave 24.0% S; Calc. 22.5% S. Electrical resistivity measurements on a crystal gave values of $2.5\times10^{-4}$ ohm at 298° K. and $1\times10^{-4}$ ohm cm. at 4.2° K.

EXAMPLE 3

A mixture corresponding to $SmVS_3$ (0.7581 g. Sm, 0.2569 g. V, 0.4850 g. S) was sealed with 0.05 g. of iodine in an evacuated carbon-coated silica tube and treated as in Example 1. The product after heating at 1000° C. contained 2 phases, $V_2S_3$ and an unidentified yellow phase. It was reground, pelleted, sealed in silica and heated at 900° C. for two days. X-ray diffraction still showed the two phases. It was resealed in silica and heated at 1150° C. for 3 days. The product was a single phase black material which showed a pseudotetragonal powder pattern similar to other members of this invention.

EXAMPLE 4

A mixture corresponding to $SmTiS_3$ (0.5106 g. Sm, 0.1627 g. Ti, 0.3267 g. S) was sealed with 0.05 g. of iodine in an evacuated carbon-coated silica tube and heated at 600° C. in the hot zone, 300° C. in the cool zone for 2 days. It was shaken, reheated 800° C. in the hot zone, 600° C. in the cool. The product after 2 days was composed primarily of black microcrystals with a small amount of $SmI_3$ transported. The powder pattern was indexed on the basis of a tetragonal cell with dimensions a.=4.18 A., c.=11.00 A. and is recognized as being analogous to those of the previous examples.

EXAMPLE 5

A mixture corresponding to the stoichiometric $GdTaS_3$ along with a trace of iodine was reacted in the manner described for Example 4. The reaction still appeared incomplete. It was then heated an additional two days at 1100° C., whereupon the product appeared to be homogeneous, shiny black plates. The pseudotetragonal X-ray powder pattern was like those of previous examples.

When the crystals were ground in an agate mortar they tended to be readily matted and slippery, causing the pestle to slide more readily in the mortar. The powdered crystals passed through a 325 mesh screen produced a coefficient of friction of 0.22 as described in connection with Table 2. The resistivity measured on a crystal of $GdTaS_3$ was $1.1\times10^{-4}$ at 298° K. and $4.3\times10^{-5}$ at 4.2° K.

EXAMPLE 6

An elemental mixture corresponding to the composition $LaTaS_3$ was reacted in the manner of Example 4. Thereafter the mixture was shaken and reheated at 1000° C. for two days, with an additional trace of iodine. The final product was large black flaky crystals which were electrically conductive; $\rho=3.9\times 10^{-4}$ ohm cm. at 298° K. and $1.1\times 10^{-4}$ ohm cm. at 4.2° K. The X-ray powder diagram was indexed on the basis of a pseudotetragonal cell, a.=4.08, C.=11.43 A.

EXAMPLE 7

An elemental mixture corresponding to $YbTaS_3$ was reacted in the manner of Example 4 followed by a final heating for 2 days at 1200° C. The product consisted of a sintered black powder along with large black flakes. Both powder and flakes produced the same X-ray powder diagram, similar to that of $LaTaS_3$ of Example 6. The flakes had an electrical resistivity $\rho=1.6\times 10^{-4}$ ohm cm. at 298° K. and $2.5\times 10^{-5}$ ohm cm. at 4.2° K.

$YbNbS_3$ was similarly prepared and had a similar X-ray pattern.

For comparison, under similar conditions a mixture corresponding to $YbVS_3$ (R=0.79) yielded instead $Yb_2S_3$ as the major product.

EXAMPLE 8

An elemental mixture corresponding to $LaTaSe_3$ was reacted in the manner of Example 4 followed by heating two days at 1000° C. The black product had a flaky crystal habit and a pseudotetragonal X-ray pattern similar to the $LaTaS_3$ of Example 6. Electrical resistivity of a crystal was $1.5\times 10^{-4}$ ohm cm. at 298° K. and $4\times 10^{-5}$ ohm cm. at 4.2° K.

$LaVSe_3$, $LaTiSe_3$, $LaNbSe_3$ and $GdNbSe_3$ were prepared in similar fashion and had similar pseudotetragonal diffraction patterns.

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

The embodiments of the invention in which an exclusive property or privilege is claimed are defined as follows:

1. Ternary chalcogenides of the formula $$Ln^{+3}M^{+4}X_3^{-2}$$

wherein
$Ln^{+3}$ is a trivalent cation selected from the group consisting of bismuth, yttrium and the lanthanide elements of atomic number 57 through 71 inclusive.
$M^{+4}$ is a tetravalent transition metal cation selected from the group consisting of titanium, vanadium, niobium and tantalum,
$X^{-2}$ is a divalent chalcogenide anion selected from the group consisting of sulfur and selenium, and
the ionic radius ratio $$\frac{r_{Ln}^{+3}+r_M^{+4}}{r_X^{-2}}$$

is at least 0.82.

2. The ternary chalcogenides of claim 1 in which the ionic radius ratio is at least 0.85.

3. The ternary chalcogenides of claim 2 in which the trivalent cation is a lanthanide element of atomic number 57 through 71 inclusive.

4. The ternary chalcogenides of claim 3 in which the transition metal cation is titanium.

5. The ternary chalcogenides of claim 3 in which the transition metal cation is niobium.

6. The ternary chalcogenides of claim 3 in which the transition metal cation is tantalum.

7. The ternary chalcogenides of claim 3 in which the transition metal cation is vanadium.

References Cited
UNITED STATES PATENTS 3,174,939   3/1965   Suchon ---------- 423—508 X

OTHER REFERENCES

Abdullaer et al., "Chemical Abstracts," vol. 70, 1969, #53481j.

Adolph et al., "Comp. Rendus," vol. 258, 1964, pp. 4773–4775.

E. Sendier et al., "Chemical Abstracts," vol. 68, 1968, #92522b.

Sterzel et al., "Zeitschrift fur anorganische und allgemeine Chemie," vol. 376, 1970, pp. 254–260.

Schmidt, "Physics Letters," vol. 31A, May 1970, pp. 551–552.

Takahashi et al., "Materials Research Bulletin," vol. 6, 1971, pp. 173–182.

Tien et al., "Chemical Abstracts," vol. 74, 1971, #80785a.

HERBERT T. CARTER, Primary Examiner

U.S. Cl. X.R.

423—508, 511; 252—12, 25